Jan. 13, 1953  G. N. HOWATT  2,625,663
TRANSDUCER
Filed May 8, 1948  2 SHEETS—SHEET 1
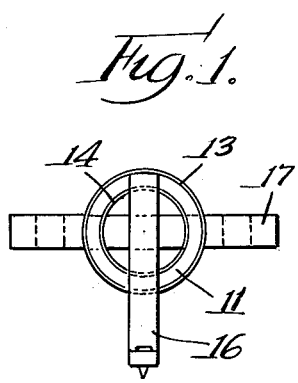
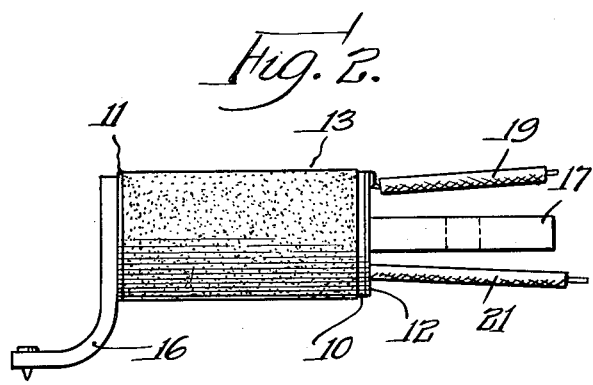
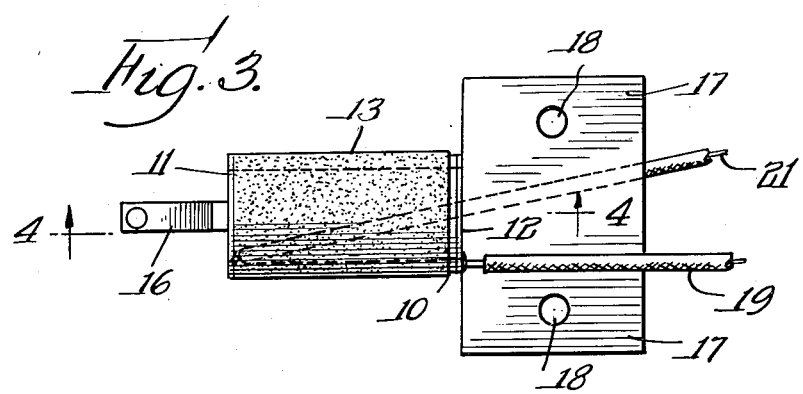
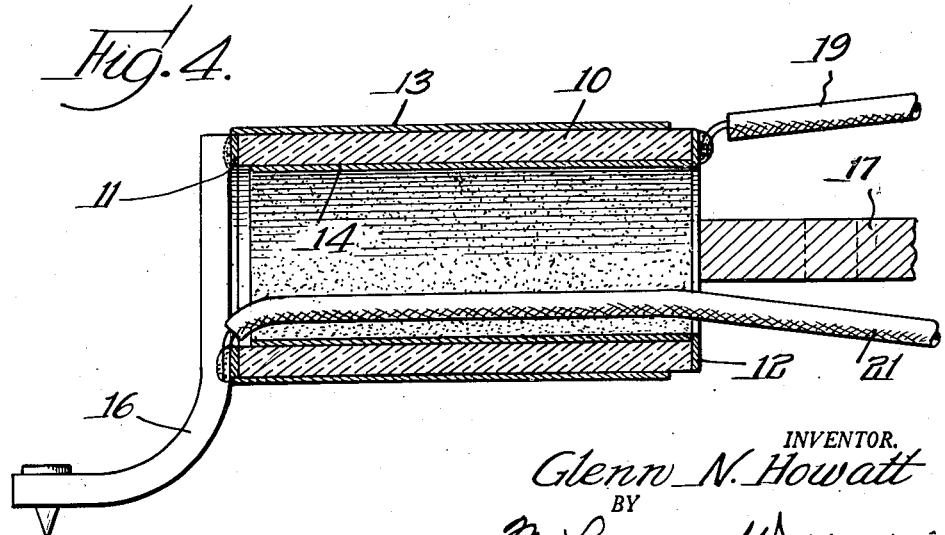
INVENTOR.
Glenn N. Howatt
BY Jan. 13, 1953  G. N. HOWATT  2,625,663
TRANSDUCER
Filed May 8, 1948  2 SHEETS—SHEET 2
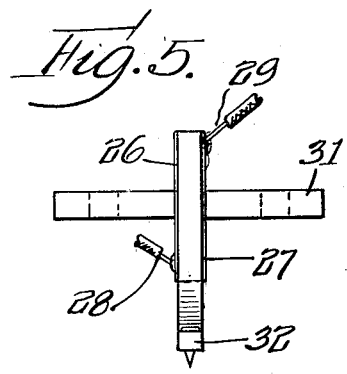
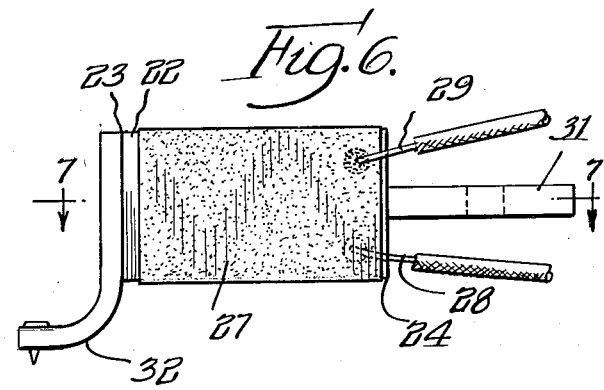
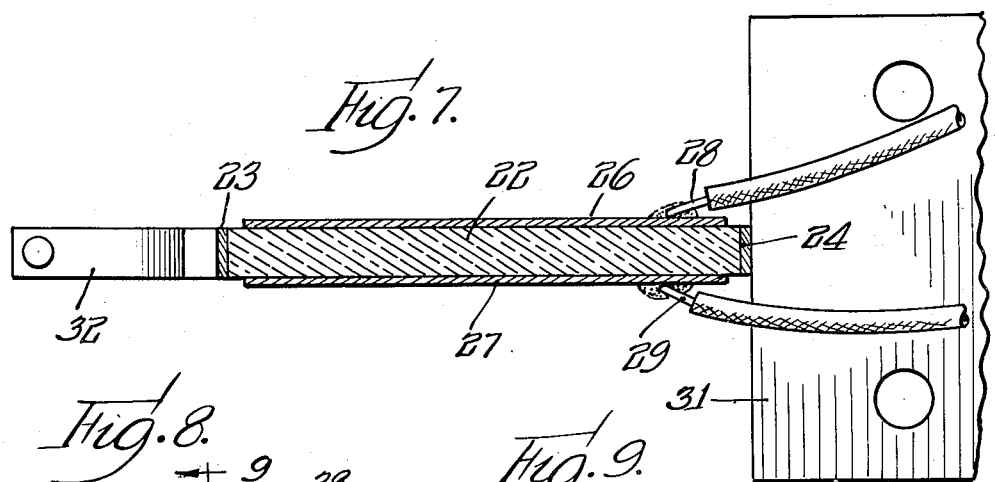
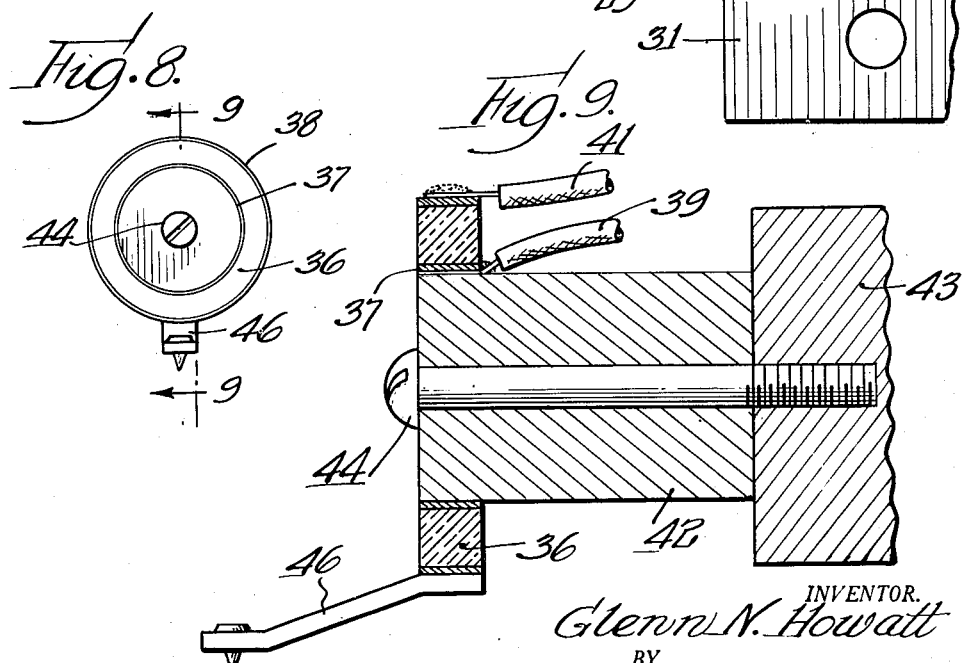
INVENTOR.
Glenn N. Howatt
BY
McLaughlin & Wallenstein
attys.

Patented Jan. 13, 1953

2,625,663

UNITED STATES PATENT OFFICE 2,625,663

TRANSDUCER

Glenn N. Howatt, Metuchen, N. J., assignor to Gulton Mfg. Corp., Metuchen, N. J., a corporation of New Jersey Application May 8, 1948, Serial No. 25,841

6 Claims. (Cl. 310—8.5)

The present invention relates to an improved transducer.

The principal object of the invention is the provision of an improved transducer element.

Another object is the provision of an improved type of transducer comprising a piezo electric polygranular ceramic element effective in the shear mode.

In carrying out the objects of the invention, a piezo electric ceramic of suitable shape, advantageously cylindrical, is produced, and by the use of permanent or temporary charging electrodes a polarizing electric field is applied at right angles to the alternating potentials generated in response to shear vibration stresses to be applied thereto. The piezo electric ceramic body is then provided with a pair of conducting signal electrodes on opposite large area surfaces at right angles to the charging electrodes, and actuating and mounting means attached to the ceramic body in such a manner that vibration of the ceramic, when the actuating means is effective, will stress the ceramic in a shear mode and thus generate alternating potentials between the two later applied signal electrodes.

Other objects and detailed features of the invention will be apparent from a consideration of the following description taken with the accompanying drawings wherein—

Fig. 1 is an elevational view of a transducer element in which the piezo electric ceramic is cylindrical in form;

Fig. 2 is a side elevational view thereof;

Fig. 3 is a plan view;

Fig. 4 is a sectional view taken on the lines 4—4 of Fig. 3;

Fig. 5 is an elevational view showing the use of a flat form of crystal;

Fig. 6 is an elevational view thereof;

Fig. 7 is a plan view;

Fig. 8 is a front elevational view showing still another embodiment; and

Fig. 9 is a sectional view taken on the line 9—9 of Fig. 8.

Referring now first to Figs. 1-4, inclusive, the transducer comprises a cylindrical pure barium titanate ceramic 10 having end electrodes 11 and 12, an external electrode 13 which is in electrical contact with the end electrode 11 and an internal electrode 14 which is in electrical contact with the end electrode 12. A phonograph needle 16 is soldered to the end electrode 11 in the manner particularly shown in Fig. 2 and Fig. 4, and a base plate 17 is soldered to the end electrode 12. The base plate 17 has holes 18 for mounting to a tone arm or other apparatus. One signal lead 19 is soldered to the end electrode 12 and, therefore, is in electrical contact with the internal electrode 14 and the other signal lead 21 is soldered to the end electrode 11 and is, therefore, in electrical contact with the external electrode 13 in which the ceramic body 10 is made up of commercially pure barium titanate comprising essentially $BaTiO_3$. In actual practise, the ceramic body produced has been approximately ¼" in length, $\frac{1}{16}$" outside diameter, and $\frac{9}{100}$" inside diameter. Various suitable ways of producing it can be employed to advantage and the cylinder may be extruded from a heavy slip which is substantially self-sustaining on extrusion and which after extrusion is dried and fired in a manner usual in the art.

The end or temporary conducting electrodes were formed by means of a silver paste or frit consisting of powdered silver mixed with a ceramic binder and a small percentage of powdered glass. The cylinder was baked for twenty minutes at 700 degrees C. after the application of the silver frit and electrodes to bond the same, and after cooling the phonograph needle was soldered across one end of the tube 10 in the manner shown and the base plate soldered across the other end at right angles to the phonograph needle. The signal leads 19 and 21 were then soldered to the end electrodes and a potential of 10,000 volts was applied between the two end electrodes while the ceramic cylinder was submerged in carbontetrachloride to inhibit arcing. When the charging potential had remained for twenty minutes across the electrodes in the manner described, the charging potential was discontinued and the cylinder was removed from the carbontetrachloride and permitted to dry. The conducting electrodes 13 and 14 were then painted on the inside and outside of the cylinders using an air drying conducting silver paint, care being taken to assure contact between the end electrodes in accordance with the desired arrangement and to avoid the possibility of short circuit from the conducting electrodes to the opposite end electrodes. Electrical continuity tests were employed to show that there was no conducting point between the inside and outside conducting electrodes.

When the transducer element had been so produced it was measured for capacitance between the inside and outside electrodes by connecting the leads 19 and 21 across a capacitance bridge and the electrical capacitance was found to be .0015 microfarad. The mounting holes 18 were then employed to secure the transducer to a conventional phonograph pick-up and a high impedance volt meter attached to the leads while the phonograph needle was caused to play a standard test record. A potential of .45 volt was observed on the high impedance volt meter. The leads were then connected to the input circuit of an ordinary amplifier forming part of a conventional type electric reproducer and unusually satisfactory reproduction obtained.

Those skilled in the art will understand that in the transducer described the dimensional shape of the piezo electric ceramic permits a uniform and single polarity of stress to be generated in its volume in respect to the two conducting or signal electrodes while at the same time permitting the volume of the element to be polarized by a strong electric field in a direction perpendicular to the signal or conducting electrodes. The cylindrical shape satisfied these conditions because the twisting thereof by opposing couples only at its ends facilitates a system of uniform shearing stress. In the cylinder there are no other forms of stress which must be taken into consideration; all other forms of stress vanish. The cylinder is polarized with a suitable electric field in a direction along its axis by the use of the temporary electrodes, and the voltage gradient is preferably about 50 volts per mil of lineal dimension. The charging period may vary depending upon many conditions. The plane of shear upon twisting will embrace the directions of polarizing and signal fields. The signal fields effective at the electrodes 13 and 14 are, as pointed out, perpendicular to the polarizing field which is between the two temporary or end electrodes 11 and 12.

In Figs. 5–7, a transducer is shown in which some, but not all, of the advantages of the main embodiment of the invention may be secured. This transducer comprises a barium titanate polygranular body 22 of rectangular cross section having end electrodes 23 and 24 which comprise the charging electrodes and side electrodes 26 and 27 which comprise the signal electrodes. Signal leads 28 and 29 are soldered to the electrodes 26 and 27, respectively. A base plate 31 is soldered to the end electrode 24 and a phonograph needle 32 is soldered to the end electrode 23.

In producing the transducer shown in Figs. 5–7, inclusive, the ceramic body 22 is cut from a sheet of about .050" thickness and has a dimension of approximately ¼" x ¼". The end electrodes 23 and 24 are first applied in position in the same general manner as described in the previous embodiment and a charging field of 10,000 volts introduced over a period of approximately ½ hour. The signal or conducting electrodes 26 and 27 are then applied, care being taken to avoid contact with the end electrodes. The leads 28 and 29 are then soldered to the conducting electrodes and the base plate and phonograph needle soldered in position on the temporary end electrodes.

The transducer so produced operated satisfactorily in playing a recording, similar to that referred to in connection with the first described embodiment wherein the needle movement was from side to side to cause a shear vibration of the transducer element. This form of the invention, in some respects, is not so satisfactory as that employing the cylinder in that it is more fragile and the stresses set up by vibrations are not entirely in the shear mode, and unless the parts are accurately and carefully produced there will be some cancelling out of the signal by generation of a negative potential opposing the positive signal potential. The potential observed on a high impedance volt meter was not as great as that observed in connection with the first described embodiment.

In the form of the invention shown in Figs. 8 and 9, the ceramic body 36 is provided with inner and outer electrodes 37 and 38, respectively, to which signal leads 39 and 41 are attached. A cylindrical supporting block 42, such as of Bakelite or the like, is adhesively secured to the inside face of the ceramic element, and is itself secured to a base 43 by a screw 44. A phonograph needle 46 is soldered to the outer electrode at a point for engagement of a record when the base 43 is secured to a usual tone arm of a phonograph. In this form of the invention substantially all stress resulting from vibration of the ceramic is in the shear mode.

The ceramic element shown in Figs. 8 and 9, like the other ceramic elements shown, is charged by means of a direct current potential employing the permanent or suitable temporary electrodes. In this connection, I wish to point out that considerable advantage seems to be obtained, particularly in certain forms, if the charging direct current potential is applied at right angles to the direction of movement of the alternating signal potential as determined by the positions of the permanent signal electrodes. The temporary charging electrodes may be placed in any suitable location, or may be at spaced intervals (using, for example, four charging electrodes) as may be necessary to obtain the desired alignment of the domains, so that when the ceramic is mounted in the manner described, vibrations and resulting stresses will be in the shear mode.

My invention utilizes a discovery which I believe to be novel, namely, that the piezo-electric modulus is of the same order of magnitude in orthogonal directions to the charging direction, and several advantages may be taken of this fact, including the ability to charge at a lower voltage than would be indicated by the positions of the permanent electrodes, particularly in certain forms of application, as in a so-called cutter.

While the ceramic body is advantageously a pure barium titanate, many forms of titanate ceramic may be used. One example is a mixture of barium and strontium titanate which is effective as long as the ceramic is maintained below the Curie point, which, as is known, is lower in a barium strontium mixture than in the case of pure barium titanate.

While the transducer shown is of a type intended for phonograph pickups, the invention may be applied to transducers of the type used for cutters, microphones and the like in which the energy change is from mechanical to electrical or vice versa, and in which some type of vibration conducting member other than a phonograph needle is associated with the piezoelectric ceramic element.

What I claim and desire to protect by Letters Patent of the United States is:

1. A transducer comprising a hollow cylindrical titanate ceramic element, end charging electrodes thereon, inner and outer signal electrodes, a support secured to one end electrode and a vibration conducting member secured to the other end electrode.

2. The method of producing a piezo-electric ceramic element which comprises forming a piezoelectric body, placing temporary electrodes at opposite portions of the said body, charging the same with a direct current potential by the use of said temporary electrodes, and applying permanent signal electrodes at positions at right angles to the positions of said temporary charging electrodes.

3. In a transducer of the character described, a titanate ceramic member having a pair of opposed signal electrodes, said ceramic member being permanently polarized in a direction at right angles to the direction of the signal voltage between the signal electrodes.

4. In a transducer of the character described, a titanate ceramic member having a pair of opposed signal electrodes, said ceramic member being permanently polarized in a direction at right angles to the direction of the signal voltage between the signal electrodes, means for supporting the ceramic member, and means for imparting to the ceramic member shear mode vibrations at right angles to the directions of polarization and signal voltage.

5. In a transducer of the character described, an elongated titanate ceramic member having a pair of signal electrodes on opposite sides of the ceramic member and a pair of polarizing electrodes on opposite ends of the ceramic member, said ceramic member being permanently polarized lengthwise between the polarizing electrodes and at right angles to the direction of the signal voltage between the signal electrodes.

6. In a transducer of the character described, an elongated titanate ceramic member having a pair of signal electrodes on opposite sides of the ceramic member and a pair of polarizing electrodes on opposite ends of the ceramic member, said ceramic member being permanently polarized lengthwise between the polarizing electrodes and at right angles to the direction of the signal voltage between the signal electrodes, means for supporting the ceramic member, and means for imparting to the ceramic member shear mode vibrations at right angles to the directions of polarization and signal voltage.

GLENN N. HOWATT.

REFERENCES CITED

The following references are of record in the file of this patent:

UNITED STATES PATENTS

| Number | Name | Date |
|---|---|---|
| 2,387,472 | Sontheimer | Oct. 23, 1945 |
| 2,486,560 | Gray | Nov. 1, 1948 |

OTHER REFERENCES

"Dielectric and piezoelectric properties of barium titanate," by S. Roberts, Physical Review, vol. 71, No. 12, June 15, 1947, pages 890–895.

"Effect of field strength on dielectric properties of barium strontium titanate," by H. L. Donley, RCA Review, September 1947, vol. VIII, No. 2, pages 539–553.